United States Patent [19]
DeAngelis

[11] Patent Number: 4,534,835
[45] Date of Patent: Aug. 13, 1985

[54] ELECTROLYTIC AL PRODUCTION WITH REACTION SINTERED MULTIPHASE CERAMIC

[75] Inventor: Thomas P. DeAngelis, Horseheads, N.Y.

[73] Assignee: Corning Glass Works, Corning, N.Y.

[21] Appl. No.: 454,674

[22] Filed: Dec. 30, 1982

[51] Int. Cl.³ .............................................. C25C 3/06
[52] U.S. Cl. ................. 204/67; 204/243 R; 204/279; 204/294; 264/65; 501/96
[58] Field of Search ............ 204/67, 291, 294, 243 R, 204/279, 290 R, 293; 264/65; 501/96

[56] References Cited

U.S. PATENT DOCUMENTS

| | | | |
|---|---|---|---|
| 3,011,982 | 12/1961 | Maduk et al. | 204/291 |
| 3,011,983 | 12/1961 | Ricker et al. | 204/291 |
| 3,108,887 | 10/1963 | Lenie et al. | |
| 3,143,413 | 8/1964 | Krapf. | |
| 3,215,545 | 11/1965 | Reidl et al. | 501/96 |
| 3,251,700 | 5/1966 | Mandorf, Jr. | |
| 3,305,374 | 2/1967 | Murata et al. | |
| 3,328,280 | 6/1967 | Richards et al. | 204/243 R |
| 3,353,954 | 11/1967 | Williams | 75/201 |
| 3,705,112 | 12/1972 | Nienart. | |
| 3,856,650 | 12/1974 | Kugler et al. | 204/290 R |
| 3,928,244 | 12/1975 | Passmore. | |
| 4,333,813 | 6/1982 | Kaplan et al. | 204/243 R |
| 4,341,611 | 7/1982 | Kaplan | 204/243 R |

FOREIGN PATENT DOCUMENTS 2757808 6/1978 Fed. Rep. of Germany ...... 204/291
954272 4/1964 United Kingdom .

Primary Examiner—Howard S. Williams
Assistant Examiner—Terryence Chapman
Attorney, Agent, or Firm—R. N. Wardell

[57] ABSTRACT

Component of electrowinning or electrorefining cell, which component in use is normally in contact with molten aluminum or in electrical contact with another component which is in contact with molten aluminum. Surface and/or inner portion of component is made of ceramic body formed by reaction sintering at pressures ranging from subatmospheric to superatmospheric of reactants, which can be elements, compounds, intermetallic compounds and/or alloys, in stoichiometric proportions to substantially from 5-95 mole percent of first phase or phases being boride, carbide, silicide, and/or sulfide of one or more of the elements of Groups 4b, 5b and 6b, which phases have a maximum grain size substantially not greater than 10 μm. and which body contains 0 to 4 weight percent oxygen. Also production cell, and method of producing aluminum in such cell, with the reaction sintered ceramic component.

20 Claims, 1 Drawing Figure

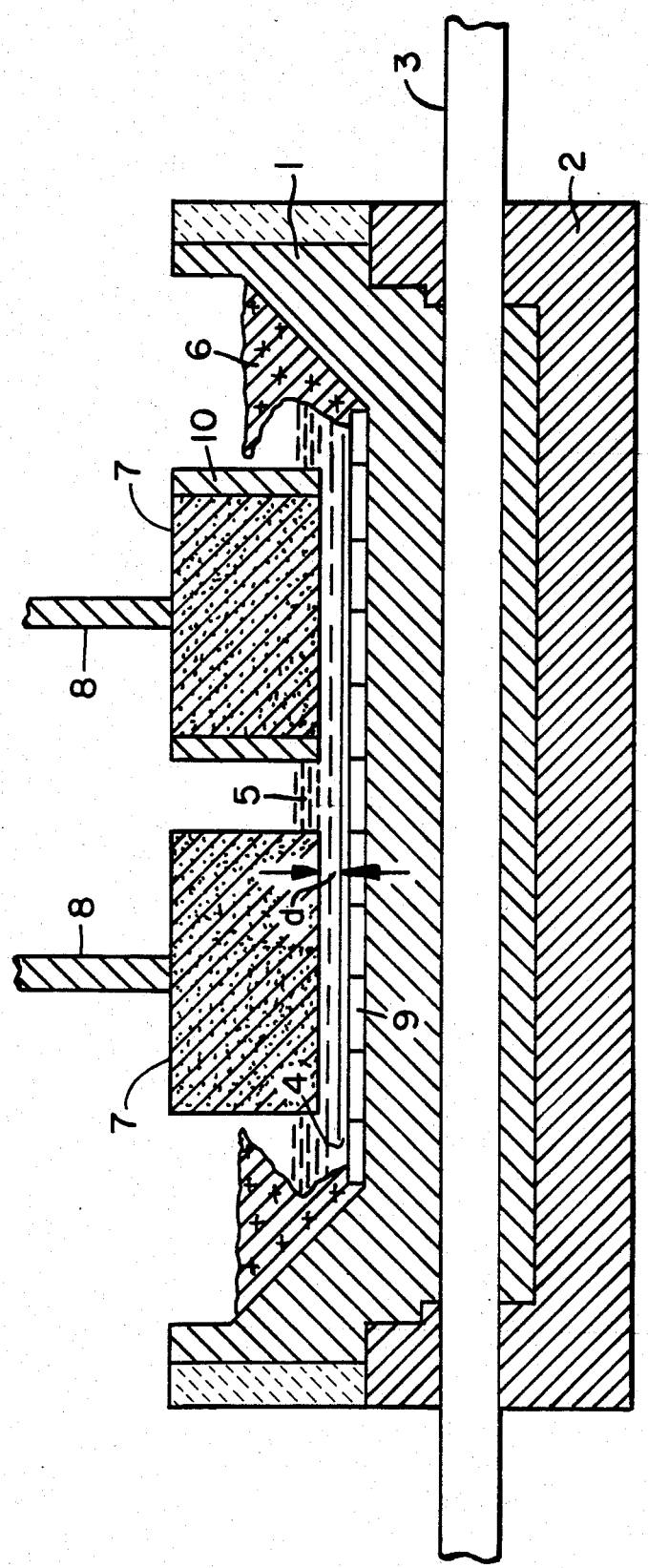

ELECTROLYTIC AL PRODUCTION WITH REACTION SINTERED MULTIPHASE CERAMIC

RELATED APPLICATION

My application titled REACTION SINTERED MULTIPHASE CERAMIC Ser. No. 454,673 and concurrently filed herewith discloses and claims the multiphase ceramic body and method of forming that body which forms a part of the invention claimed herein. That other application is incorporated herein by reference.

BACKGROUND OF THE INVENTION

This invention relates to cells and components thereof employed in the electrolytic production of aluminum from a fused bath, both by electrowinning and electrorefining processes, and to the aluminum production processes employing such cells and components.

Most aluminum is made by the Hall-Heroult process comprising electrolysis of alumina in a molten cryolite bath using carbon anodes and cathodes. The aluminum settles under the cryolite bath on the carbon cathode. However, the aluminum does not wet the carbon cathode and electromagnetic forces in the cell produce waves in and the humping of the molten aluminum. To ensure that the carbon cathode floor of the cell is always completely covered with aluminum, a relatively thick cathode layer, pad or pool of aluminum is maintained, which continues to be subject to waving and humping movement. The latter factor necessitates substantial anode-cathode spacing or gap to avoid shorting between the anode and the moving aluminum cathode pool. It is that spacing or gap that causes considerable electrical energy loss in the resistance heating of the cryolite-aluminum cell bath therein.

Various cell designs of drained cathodes and of cathode pool packing, baffles or weirs have been proposed to alleviate the aluminum movement and energy problem. Also, various aluminum-wettable materials and bodies have been proposed without much success for economically accomodating cell designs that can alleviate those problems. There remains the basic need for cathodes and cathode pool structures of aluminum wettable, durable bodies which can be readily and economically fabricated.

SUMMARY OF THE INVENTION

This invention overcomes the foregoing problems by providing certain components of an electrolytic aluminum production cell, which in use are normally in contact with molten aluminum or in electrical contact with other components which are normally in contact with molten aluminum, with surface and/or inner portions of the components made of reaction sintered multiphase ceramic as defined herein, which is wettable by and durable in molten aluminum and cryolite as well as being electrically conductive. The invention involves not only the new components, but also the cells for and methods of producing aluminum by electrolysis, including both electrowinning and electrorefining aluminum.

In its most fundamental aspect, the invention is the aforesaid components whose surface and/or inner portions are made of a reaction sintered multiphase ceramic consisting essentially of a fine-grained, homogeneous, intimate interdispersion of:

(a) 5–95 (preferably 45–95) mole percent of first phase or phases having a maximum grain size substantially (e.g., at least 95 volume percent) not greater than 10 $\mu$m and being nitride of one or both of Al and Si, and (b) 5–95 (preferably 5–55) mole percent of second phase or phases having a maximum grain size substantially (e.g. at least 95 volume percent) not greater than 10 $\mu$m and being boride, carbide, silicide, sulfide or combination thereof of one or more of the elements of Groups 4b, 5b and 6b;

which ceramic contains 0 to 4 weight percent oxygen and is prepared by the process comprising:

(c) admixing particulate reactants of maximum particle size substantially (e.g. at least 95 volume percent) not greater than 150 $\mu$m and being elements compounds, intermetallic compounds, alloys or combination thereof in stoichiometric proportions to substantially form the nitride and second phases, and (d) shaping and heating the admixture to form the reactive sintered ceramic, the heating being done in nonreactive atmosphere and at temperature at which the reaction and sintering occurs between the reactants to substantially form the nitride and second phases.

Most desirably, boride constitutes the second phase or phases, especially of Group 4b elements, and the nitride phase is AlN.

Reaction sintering involves the dual effect of reaction between and sintering together of the admixed particulate reactants at temperature causing the reaction to occur and be substantially completed. It may be effected at atmospheric, subatmospheric or superatmospheric pressure. The latter condition involves the substantially simultaneous shaping and heating steps of hot pressing to produce a ceramic component of the invention with very little or no open porosity and highest strength properties, although some preliminary separate pressing or heating of the reactant admixture may be advantageously done. Where open porosity is desired in an otherwise tough and hard ceramic component of the invention, the separate heating step at atmospheric or subatmospheric pressure may be employed sequentially following the shaping step.

Of course, reaction temperature is governed by the particular reactants and their identified reaction temperature at whatever pressure is selected for performing the heating step.

The component of the invention may contain, as part of the first and/or second phase, diluent which is a nonreacted portion of the reactant admixture as a stoichiometric excess amount of a reactant and/or as a nitride or second phase according to the aforesaid invention definition but different than the reactants.

BRIEF DESCRIPTION OF THE DRAWING

The sole FIGURE is a schematic, vertical cross-sectional view of an aluminum electrowinning cell incorporating components comprising the composite body in accordance with the invention.

DETAILED DESCRIPTION

The invention will be illustrated by reference to one exemplary type of production cell and process, but it is capable of being adapted to other types of electrolytic aluminum production cells and processes, including electrorefining.

The sole FIGURE schematically shows a cell comprising a carbon liner and cathode base 1 in a heat-insulating shell 2 and with a cathode current collector or bar 3 embedded in the liner 1. Within the liner 1 is a shallow or thin cathodic layer or film 4 of molten aluminum and an alumina-containing molten cryolite electrolyte 5 at a temperature of 940°–1000° C. This electrolyte commonly consists of sodium cryolite ($Na_3AlF_6$) as the major component plus about 4–10 wt. % calcium fluoride, about 2–10 wt. % aluminum fluoride and about 2–8 wt. % alumina. However, as desired, the electrolyte may be of other alumina-containing compositions. The aluminum layer 4 and molten electrolyte 5 are surrounded by a crust or frozen layer or "freeze" 6 of the solidified electrolyte. Anodes consisting of prebaked blocks of carbon 7, which are suspended by anode current feeders 8, dip into the molten electrolyte 5 above the shallow aluminum layer or film 4, with a spacing d being maintained between the bottom of blocks 7 and the top of the thin layer or film 4. Commonly commercial cells have several rows of pairs of anodes 7. Blocks 7 are generally of the same size in each cell. Such size can range from about 60×40×40 cm for small cells to about 150×100×70 cm for large cells. Operating anode current density is usually between 6 and 10 $kA/m^2$.

The carbon cathode base 1 has its upper surface, which faces anode blocks 7, covered by a cathode layer 9 of slabs, segments or plates positioned either closely together or in spaced relation to allow the molten aluminum formed as film 4 on layer 9 to drain continuously off of the top of layer 9 into suitable reservoir or collection basin (not shown). The segments of layer 9 can be either fastened to the carbon base 1 (e.g. by pegs of carbon or the material of layer 9) or merely placed thereon, with mating surfaces providing good electrical contact as needed. These segments of layer 9 (or surface portion thereof) are one of the components desirably formed of reaction sintered multiphase ceramic according to the invention. Such segments, plates or slabs of the reaction sintered ceramic can be about 0.5–5 cm thick e.g. approximately 2.5 cm. They can be of any suitable length, width and geometric shape. For convenience of manufacture and installation, the slabs can be made with length and width dimensions in the range of about 5–15 cm, e.g. about 10 cm., for square or hexagonal shapes.

By using this layer 9 of the ceramic plates of the invention as an operative aluminum-wettable surface in contact with the cathodically collected molten aluminum, layer 4 of such molten aluminum can be easily maintained thin enough to avoid significant waving or humping therein, e.g. as a thin film typically less than about 1 mm or as a shallow layer of desired constant thickness, e.g. up to about 1 cm, if appropriate weirs or restraining means (not shown) are used at edges of layer 9 (which may also be formed of the ceramic according to this invention). In either case, no significant waving or humping occurs in the thin aluminum layer 4 and the distance d can be greatly and reliably minimized, e.g. to about 2 to less than 3.8 cm; to reduce electrical energy loss.

Further electrical energy savings may be achieved when even further portions of cell lining 1 are also constructed of the ceramic components of the invention. Even the cathode current collector 3 (or inner portion thereof) may be formed of those ceramic components.

If carbon anodes 7 are employed, their position with respect to the desired spacing d can be adjusted as the blocks 7 wear away, with computer-controlled anode feed devices maintaining the gap d relatively constant. Alternatively, the carbon anode 7 can be replaced with oxygen-evolving anodes that remain relatively dimensionally stable, in which case the cell may be operated at higher current densities up to 20–50 $kA/m^2$. Optionally these anodes 7 may have a protective and/or reinforcing casing 10, e.g. of alumina, to reduce the rate of wear and loss of carbon blocks 7.

In producing aluminum in the cell shown in the drawing, additional alumina is fed into the electrolyte 5 as it becomes depleted of alumina by its electrolytic reduction to aluminum which settles onto and drains off of layer 9 in conventional manner.

COMPONENT PREPARATION

It is believed that reaction sintering relies on the reaction having a substantial negative heat of formation as the driving force for the reaction. The products or components formed must have lower free energy of formation than the reactants from which they were prepared. The elements of the groups of the Periodic Table as recited in the description of the invention are selected for the invention body so as to conform to these principles.

Reaction sintering is initiated by heating the shaped mixture. At the reaction initiation temperature, the reactants begin to react and liberate a substantial amount of heat. This exotherm causes a sharp temperature rise in the reactant powder mixture. It is believed that this rapid temperature rise permits rapid diffusion of the reactants within the mixture, which causes either hot pressing compaction or sintering shrinkage under atmospheric or subatmospheric pressure as well as further chemical reaction to occur quickly. The reaction initiating temperature is generally much lower than the temperature necessary to attain a dense body by conventional hot pressing or separate pressing and sintering of preformed phase ingredients where no reaction occurs.

Several processing parameters may be adjusted to optimize the conduction of the reaction sintering and the properties of the resultant ceramic body. Some of these parameters are: type, purity and surface area of the particulate reactants; stoichiometry of the reactant mixture; pretreatment of the reactants, rate of heating; magnitude of applied pressure before and/or during heating; post heating treatments; and geometry of the body of component.

Reaction sintering of admixtures according to this invention produces components or bodies with the nitride and second phases having very small grain size, generally about one order of magnitude smaller than the particle size of the starting reactant powders. The reaction sintered ceramic bodies can be easily prepared with maximum grain sizes of the nitride and second phases being substantially (e.g. at least 95 volume percent) not greater than 5 $\mu$m (preferably not greater than 1 $\mu$m) or even with mean grain sizes of such phases being (e.g. at least 95 volume percent) not greater than 6 $\mu$m (preferably 2 $\mu$m). These very fine grain sizes can be attained by using reactants with maximum particle sizes substantially (e.g. at least 95 volume percent) not greater than 44 $\mu$m or with mean particle sizes less than about 25 $\mu$m. Grain growth is usually not experienced because the components or bodies can be made at significantly lower temperatures with shorter hold times at heating temperature than by conventional nonreactive manufacturing techniques. Achieving such small grain sizes is often difficult if not impractical to accomplish using conventional nonreactive techniques because either preformed phase powders are not readily available in such small particle size of less than 5 μm or irregular grain growth occurs at the higher processing temperatures in the absence of effective grain growth inhibitor.

Generally the particulate reactants are mixed in the stoichiometric proportions to form the desired product phases. For example, the following molar proportion formula describes exemplary reaction mixture and product phases:

$$AlB_2 + TiN \rightarrow TiB_2 + AlN$$

However, nonstoichiometric proportions (e.g. of TiN) may be used in order to vary the properties of the product or to control the reaction process. Powdered diluent material may also be added to the reactant mixture. The diluent may be or contain one of the elements of the reactants or may be the same as one of the reaction-produced phases in the products or may be other suitable material, any of which may be used to control the reaction sintering or properties of the resultant product. The amount of diluent or diluents must be less than that amount which would prevent the reaction sintering from taking place.

The reactants can be mixed or blended in any suitable manner known to those skilled in ceramic technology for yielding an intimate, homogeneous mixture or reactant particles, e.g. by ball milling in dry or wet condition.

For very dense products, the hot pressing procedure, including hot isostatic pressing, is employed. The mixed reactants are charged into a mold. If desired, those reactants may be given pretreatments such as dehydration, degassing or burn-out of binder, provided the pretreatment temperature is kept below the reaction initiation temperature. It is advantageous to precompact the reactant mixture at room temperature and at 50-100% of hot pressing pressure to ensure a uniformly compacted product after hot pressing. This was routinely done in making samples of the invention. For common hot pressing with a mold comprising an annular die with upper and lower plungers, the mold for precompaction (and even pretreatment) is preferably the same one used in subsequent hot pressing. The mold can be of any material not adversely reactive with the reaction mixture and that can withstand desired pressures up to 15,000 psi (about 1055 kg/cm$^2$) or more. Graphite molds have been found very suitable for pressures up to 10,000 psi (about 700 kg/cm$^2$) and were exclusively used in making the samples of the invention. At least the precompaction pressure is usually applied to the charged mold and a suitable atmosphere is provided to completely contact the charged mold before heating is begun to effect reaction hot pressing. A moderate vacuum (e.g. about $1 \times 10^{-4}$ Torr) was satisfactorily employed in making the samples of the invention; however, inert gas atmosphere may also be employed for the same purpose of protecting the reactants and the mold from adverse air oxidation. As necessary, the pressure is increased to the full load during heating to or at the maximum hot pressing temperature. To assure good body density, full pressure should be at least 2000 psi (about 140 kg/cm$^2$). Heating can be done in any suitable hot pressing furnace, such as an induction heating furnace or electric resistance heating furnace used to make samples of the invention, which provides very rapid heat-up. Heating rates satisfactorily employed ranged between 9 and 25° C./minute, the slower rates being used with reactant mixtures evolving hydrogen that is drawn off by the vacuum system. Heating progresses to a temperature at which the reaction sintering is initiated. That event is marked by a rapid temperature rise in the mold due to exothermic heat evolution from the reaction. When the maximum temperature and pressure for the reaction hot pressing are attained, they are usually held for at least some short period to assure complete reaction sintering, e.g. about 1-2 hours for products ranging between 1.5-3 inches (about 3.8-7.6 cm) in diameter and about 0.2-0.5 inch (about 0.5-1.3 cm) thick as in the cases of the samples made of the invention. Of course, larger plates of greater thickness (e.g. 1 inch or 2.5 cm) may need to be held slightly longer in hot pressing, perhaps up to 5-6 hours. Thereafter, the molds containing the samples are cooled in the furnace under protective atmosphere at furnace cooling rate and the pressure is held on the samples until they were cooled to about room temperature. Then the molds are removed from the furnace and the samples are pressed out of the annular mold body.

For components of less density, the reactant mixture can be fully compacted or shaped at room temperature generally at pressures up to 60,000 psi (about 4.2 tons/cm$^2$) or more, but preferably between $10-50 \times 10^3$ psi (about 0.7-3.5 tons/cm$^2$), to yield a green (i.e. unfired) body, which is subsequently sintered at atmospheric pressure. Preforming of the green body can be done by any suitable ceramic fabrication process, e.g. dry or wet pressing, isostatic pressing, slip casting, extrusion, injection molding, doctor blading, etc.

The ceramic components of this invention are very durable in contact with molten aluminum and cryolite, e.g. resistant to corrosion/erosion in aluminum cathode pools. Generally they are very refractory and thermal shock resistant. They are also electroconductive by virtue of low electrical resistivity. They are wear-resistant and hard. They also exhibit good strength and toughness. In their more porous form, they may serve, for example, as diaphragms or other components of electrolytic aluminum production cells.

Bodies A & B

The following two bodies are an exemplary comparison of a reaction hot pressed ceramic body and a conventionally nonreaction hot pressed cermet body. Both had batch mixtures formulated to give 1:1 molar ratio of TiB$_2$ and aluminum metal phases in those bodies.

Body A of the invention was formed according to the molar formula previously stated. The reactant mixture consisted of 44 wt. % AlB$_2$ of 9.2 μm mps and 56 wt. % TiN of 7.4 μm mps. The AlB$_2$ powder contained 1.9 wt. % oxygen and 0.22 wt. % carbon. The TiN powder contained 0.76 wt. % oxygen and 0.19 wt. % carbon. These reactants were dry mixed without binder in a revolving plastic jar with alumina balls. That mixture was hot pressed in a graphite mold and in a vacuum at a maximum reaction sintering temperature of 1600° C. and 4000 psi (281.2 kg/cm$^2$) for 2 hours. This reaction is particularly interesting because TiN was thought to be thermodynamically more stable than TiB$_2$. However, TiN and AlB$_2$ do react to form TiB$_2$ and AlN and that reaction is complete at 1600° C.

Body B not of the invention was formed from a batch mixture consisting of 62.9 wt. % TiB$_2$ of 3.2 μm mps and 37.1 wt. % AlN of 8.8 μm mps. The TiB$_2$ powder contained 0.36 wt. % oxygen and 0.26 wt. % carbon. The AlN powder contained 2.22 wt. % oxygen and 0.17 wt. % carbon. These nonreactive components were wet mixed with trichlorethane in a revolving plastic jar with alumina balls. The nonreactive mixture was hot pressed in the same manner as for Body A except that hot pressing was at 1650° C. and 5000 psi.

The comparative properties of Bodies A and B are set forth in Table 1. The lower resistivity values of Body A are believed related to a more uniform interdispersion distribution of small $TiB_2$ grains therein in comparison with the microstructure of Body B, the latter exhibiting larger and more nonuniform grain sizing.

Samples of Body A were tested for suitability for use as a component, e.g. cathode or cathode current collector, in an electrolytic aluminum production cell. In a cathode pool test, a sample of Body A was merely placed submerged (but not connected at the cathode) in the molten aluminum cathode pool of a laboratory test cell operated at about 1000° C. for 10 hours with anode and cathode current density of about 0.5 A/cm$^2$. In a hanging cathode test, a sample of Body A was suspended and connected as the cathode extending into the representative molten cryolite-aluminum batch of the laboratory test cell operated as noted above. The samples were wetted by aluminum in both tests. The cathode pool test showed only very slight surface erosion and one small surface crack, but otherwise the sample had original sharp edges and surface. No visible corrosion/erosion occurred in the hanging cathode test.

TABLE 1

|  | Body A | Body B |
| --- | --- | --- |
| x-ray phases (see Note 1) | $TiB_2$ (M) | $TiB_2$ (M) |
|  | AlN (m) | AlN (m) |
|  | TiN (T) |  |
| $O_2$, wt. % | 1.44 | 1.64 |
| C, wt. % | 0.21 | 0.26 |
| Boride/nitride phases grain size, um | about 1–2 | about 3.2–8.8 |
| Density, g/cc | 3.83 | 3.0 |
| % of theoretical density | 97.0 | 75.9 |
| Open porosity, % | 0.3 | 18.7 |
| Modulus of rupture @ 20° C., psi × 10$^3$ | 46.5 | 16.9 |
| (tons/cm$^2$ | 3.27 | 1.19) |
| Thermal shock 20° C. air → 1000° C. molten Al → 20° C. air. | No crack | N.D. (See note 2) |
| Electrical resistivity, $\mu\Omega$-cm. in argon: |  |  |
| 25° C. | 47.0 | 148 |
| 250° C. | 75 | N.D. |
| 500° C. | 110 | N.D. |
| 750° C. | 140 | N.D. |
| 1000° C. | 178 | N.D. |

Note 1:
(M) indicates major phase peaks, (m) indicates minor phase peaks and (T) indicates trace phase peaks.
Note 2:
N.D. indicates that property was not determined.

Bodies C & D

These bodies of the invention illustrate the effect on properties by different particle 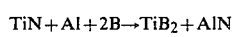 sizing of the reactant powders and demonstrate that generally superior properties are attained with finer particle sizing of those powders. Both of these bodies were made in accordance with the following molar formula:

$$TiN + Al + 2B \rightarrow TiB_2 + AlN$$

from a reactant mixture consisting of 56.02 wt. % TiN powder, 24.45 wt. % Al powder and 19.53 wt. % B powder. The particle sizes of these powders were:

| Powder | Body C | Body D |
| --- | --- | --- |
| TiN | −325 mesh | −200 + 325 mesh |
|  | 5.2 μm mps | 47 μm mps |
| Al | −325 mesh | −100 + 200 mesh |
|  | 22 μm mps | 80 μm mps |
| B | 5 μm mps | 94 μm mps |

After the usual dry mixing, the reactant mixtures were hot pressed at 1650° C. and 5000 psi (351.5 kg/cm$^2$) in vacuum. X-ray analysis of both bodies showed $TiB_2$ (M) and AlN(m). The other comparative properties of these two bodies are shown in Table 2.

TABLE 2

|  | Body C | Body D |
| --- | --- | --- |
| $TiB_2$/AlN phases grain size, μm. | <1 | 1–10 |
|  |  | (5.5 mean) |
| Al, wt. % | 23.1 | 21.4 |
| Ti, wt. % | 44.6 | 45.2 |
| N, wt. % | 12.3 | 12.3 |
| O, wt. % | 0.79 | 0.82 |
| C, wt. % | 0.25 | 0.15 |
| Density, g/cc | 3.91 | 3.48 |
| Open porosity, % | 0 | 1.6 |
| Modulus of Rupture @ 20° C., psi × 10$^3$ | 47.2 | N.D. |
| (tons/cm$^2$) | 3.32) |  |
| Young's Modulus @ 20° C., psi × 10$^6$ | 61.17 | 39.35 |
| (tons/cm$^2$ × 10$^3$) | 4.300 | 2.7666) |
| Rockwell A hardness | 91 | 74 |
| Electrical Resistivity @ 25° C., $\mu\Omega$-cm. | 48.98 | 72.44 |

Body C exhibited relatively uniform grain size and homogeneous mixture of the phases while Body D showed a large grain size range and somewhat nonhomgeneous phase distribution. However, both of these bodies will be wet by molten aluminum and will be durable in molten aluminum and cryolite. Body C is particularly suitable for functioning as a cathode or cathode pool packing element.

Body E

This body of the invention was made according to the molar formula:

$$TiAl + BN + B \rightarrow TiB_2 + AlN$$

by dry mixing a reactant mixture consisting of 67.76 wt. % TiAl powder of 33 μm mps, 22.46 wt. % BN powder of 10 μm mps and 9.78 wt. % B powder of 94 μm mps. This mixture was hot pressed in the usual manner at 1600° C. and 6000 psi (421.8 kg/cm$^2$). The resultant body had the phases $TiB_2$ (M) and AlN(m), boride and nitride grain sizes of <1 μm, 23.3 wt. % Al, 41.1 wt. % Ti, a density of 3.93 g/cc, 0.1% open porosity, Young's Modulus of 57.6×10$^6$ psi (4.05×10$^3$ tons/cm$^2$), Rockwell A hardness 90 and electrical resistivity at 25° C. of 60.2 $\mu\Omega$-cm. This body is wettable by molten aluminum and is resistant to corrosion/erosion by molten aluminum and cryolite.

Body F

This body of the invention involved the molar formula:

$$3TiSi_2 + 8BN + TiH_2 \longrightarrow 4TiB_2 + 2Si_3N_4 + H_2$$
(reactants) (product phases) (gas)

The dry-mixed reactant mixture consisted of 55.7 wt. % of TiSi$_2$ powder of −325 mesh, 35.4 wt. % of BN powder of 10μm mps and 8.9 wt. % TiH$_2$ powder of 2.4 μm mps. After hot pressing in the usual manner at 1600° C. and 6000 psi (421.8 kg/cm$^2$), the fabricated body had the phases: TiB$_2$ (M), Si$_3$N$_4$(M), BN(T) and TiSi$_2$(T). Body F also had boride and nitride grain sizes of ≦5 μm, a density of 3.15 g/cc, 12.4% open porosity and Young's Modulus of 21.59×10$^6$ psi (1.518×10$^3$ tons/cm$^2$), Rockwell A hardness 77.5 and electrical resistivity at 25° C. of 1380 μΩcm. This body is wettable by molten aluminum and is quite durable in molten aluminum and cryolite.

Body G

This body of the invention was generally premised on the molar formula:

$$3TiN + Al_4C_3 \rightarrow 3TiC + 3 AlN + Al$$

It was made from a dry-mixed reactant mixture consisting of 56.3 wt. % TiN of 7.1 μm. mps and 43.7 wt. % Al$_4$C$_3$ of 13.5 μm. mps. After hot pressing in the usual manner at 1600° C. and 6000 psi (421.8 kg/cm$^2$), x-ray analysis of the body showed phases of TiC(M), AlN(m) and Al(T). The aluminum metal phase was negligible. The body analytically contained 28.8 wt. % Al and 45.9 wt. % Ti. Properties of the body were: <5μm carbide and nitride grain sizes, 3.76 g/cc density, 3.5% open porosity, 37.31×10$^6$ psi (2.623×10$^3$ tons/cm$^2$) Young's Modulus, Rockwell A hardness 84.5 and 295 μΩ cm electrical resistivity at 25° C. This body is also wettable by molten aluminum and durable in molten aluminum and cryolite.

Other reaction sintered ceramic bodies (with or without hot pressing as desired) can be formed by appropriately selecting other reactant mixtures within the invention definition. The following molar formulas are illustrative of such other selections:

$$AlB_2 + TaN \rightarrow AlN + TaB_2$$

$$AlB_2 + MoN \rightarrow AlN + MoB_2$$

$$4Al + 2BN + CrN_2 \rightarrow 4AlN + CrB_2$$

$$Al + C + MoN \rightarrow AlN + MoC$$

$$3SiC + 4WN + C \rightarrow Si_3N_4 + 4WC$$

$$AlSi_2 + TiN \rightarrow AlN + TiSi_2$$

$$Al + 4Si + Ti_2N \rightarrow AlN + 2TiSi_2$$

$$Al + 2Si + MoN \rightarrow AlN + MoSi_2$$

$$4NbN + 11Si \rightarrow Si_3N_4 + 4 NbSi_2$$

$$Al_2S_3 + 3TaN + Al \rightarrow 3AlN + 3TaS$$

$$2Al_2S_3 + 2CrN_2 + Cr \rightarrow 4AlN + 3CrS_2$$

$$8S + 3Si + 4TiN \rightarrow Si_3N_4 + 4TiS_2$$

Components according to the invention can advantageously substitute for the cell components of boride, carbide, nitride or silicide (or refractory hard metal - RHM) as disclosed in U.S. Pat. Nos. 2,915,442, 3,028,324, 3,156,639, 3,161,579, 3,215,615, 3,274,093, 3,287,247, 3,330,756, 3,400,061, 3,930,967, 4,071,420, 4,093,524, 4,118,292, 4,177,128, 4,224,128, 4,231,853, 4,243,502, 4,333,813, 4,338,177, 4,339,316, 4,341,611, 4,342,637 and 4,349,427, in U.S. Defensive Publication No. T993,002 (of a patent application) dated April 1, 1980, and PCT published patent application No. WP-8102170, all of which documents are incorporated herein by reference.

Preferably the reaction sintered multiphase ceramic should contain less than 1 wt. % of oxygen.

I claim:

1. A component of an electrolytic aluminum production cell which in use is normally in contact with molten aluminum or in electrical contact with another component which is normally in contact with molten aluminum, characterized in that said component has a portion made of a reaction sintered ceramic consisting essentially of a fine-grained, homogeneous, intimate interdispersion of:
   (a) 5–95 mole percent of nitride phase or phases having a maximum grain size not greater than about 10 μm and being nitride of one or both of Al and Si, and
   (b) 5–95 mole percent of second phase or phases having a maximum grain size not greater than about 10 μm and being boride, carbide, silicide, sulfide or combination thereof of one or more of the elements of Groups 4b, 5 b and 6b;
   said reaction sintered ceramic contains 0 to 4 weight precent oxygen and is prepared by the process comprising:
   (c) admixing particulate reactants of maximum particle size not greater than about 150 μm and being elements, compounds, intermetallic compounds, alloys or combination thereof in stoichiometric proportions to form the nitride and second phases, and
   (d) shaping and heating the admixture to form the reaction sintered ceramic, the heating being done in nonreactive atmosphere and at temperature at which the reaction and sintering occurs between the reactants to substantially form the nitride and second phases.

2. The component of claim 1 which is prepared by the shaping and heating being separate sequential steps.

3. The component of claim 1 which is prepared by the shaping and heating being substantially simultaneous steps of hot pressing.

4. The component of claim 1 wherein the mean grain size of the nitride and second phases is not greater than 6 μm and the mean particle size of the reactants is less than 100 μm.

5. The component of claim 4 wherein the maximum grain size of the nitride and second phases is not greater than about 5 μm and the maximum particle size of the reactants is substantially not greater than about 44 μm.

6. The component of claim 5 wherein the maximum grain size of the nitride and second phases is not greater than about 2 μm.

7. The component of claim 6 wherein the maximum grain size of the nitride and second phases is not greater than about 1 μm.

8. The component of claim 1 having the second phase or phases being diboride of one or more of the elements of Group 4b.

9. The component of claim 8 having the nitride phase being AlN.

10. The component of claim 1 having 45-95 mole percent of the nitride phase or phases and 5-55 mole percent of the second phase or phases.

11. The component of claim 10 which is prepared by the shaping and heating being substantially simultaneous steps of hot pressing.

12. The component of claim 11 wherein the mean grain size of the nitride and second phases is not greater than 6 $\mu$m and the mean particle size of the reactants is less than 100 $\mu$m.

13. The component of claim 12 wherein the maximum grain size of the nitride and second phases is not greater than about 5 $\mu$m and the maximum particle size of the reactants is not greater than about 44 $\mu$m.

14. The component of claim 13 having the second phase or phases being diboride of one or more of the elements of Group 4b.

15. The component of claim 14 wherein the mean grain size of the nitride and second phases is not greater than about 2 $\mu$m.

16. The component of claim 15 having the nitride phase being AlN.

17. The component of claim 16 wherein the maximum grain size of the AlN and diboride phases is not greater than about 1 $\mu$m.

18. The component of claim 17 having a second phase of $TiB_2$.

19. An electrolytic aluminum production cell comprising one or more components as claimed in claim 1.

20. A method of producing aluminum by electrolysis in an electrowinning or electrorefining cell characterized by using a cell component as claimed in claim 1.

* * * * *